Oct. 16, 1923.  
H. A. LAMPLUGH  
1,470,627  
HANDLEBAR FOR CYCLES AND MOTOR CYCLES  
Filed Aug. 13, 1921    4 Sheets-Sheet 1
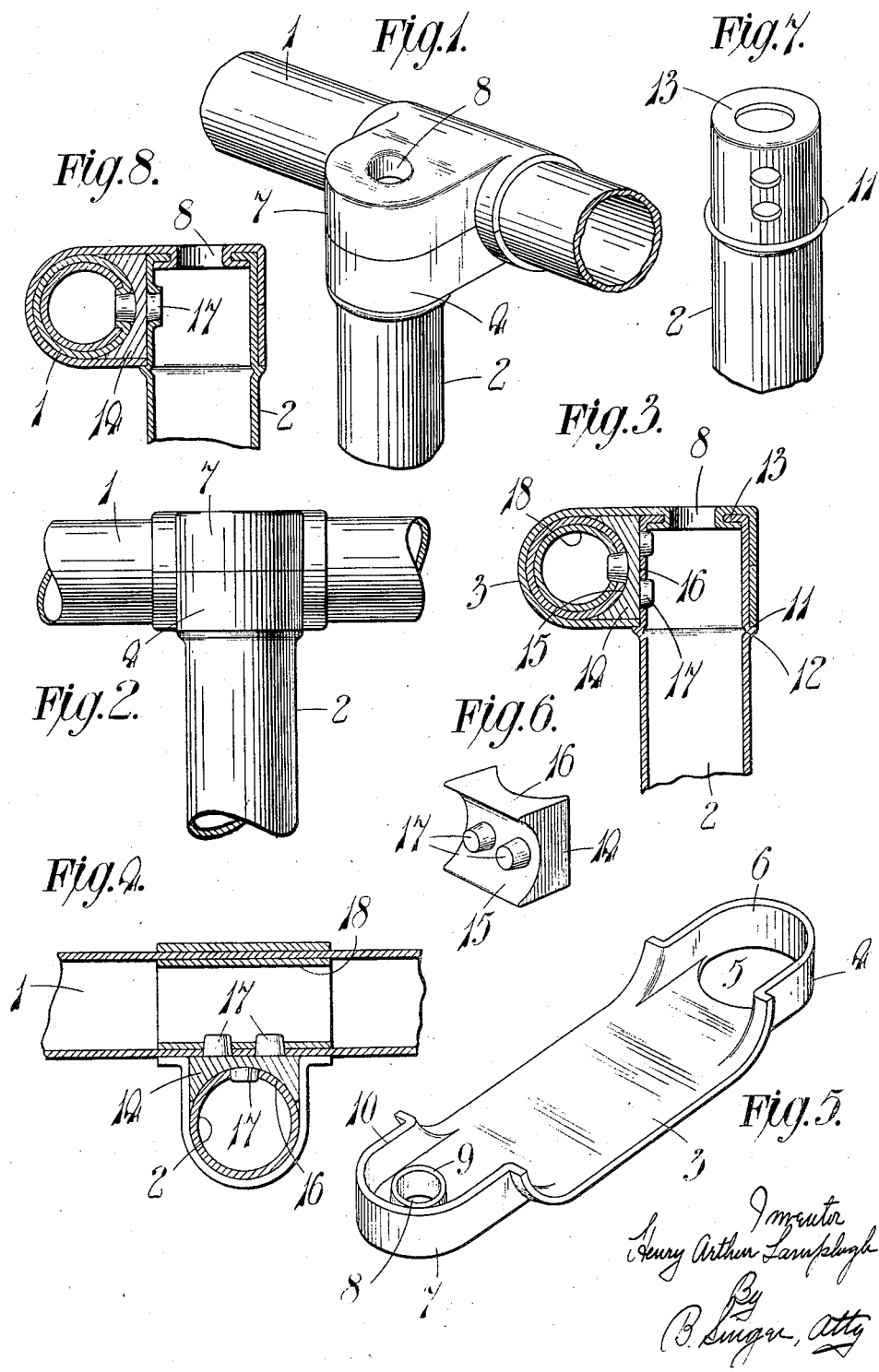

Oct. 16, 1923.   1,470,627
H. A. LAMPLUGH
HANDLEBAR FOR CYCLES AND MOTOR CYCLES
Filed Aug. 13, 1921   4 Sheets-Sheet 2

Henry Arthur Lamplugh Inventor
By B. Singer, Atty.

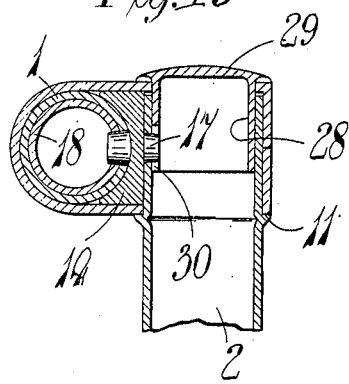
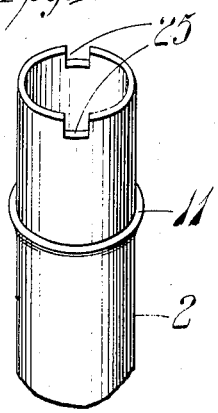
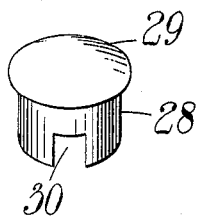
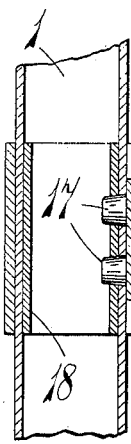
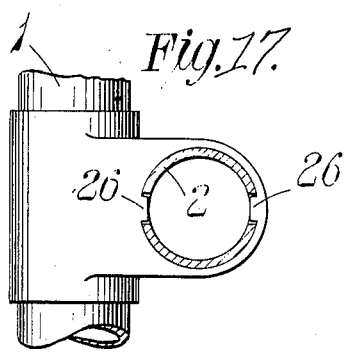
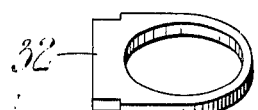
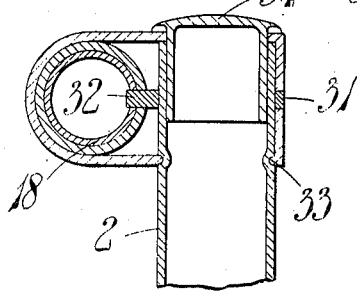
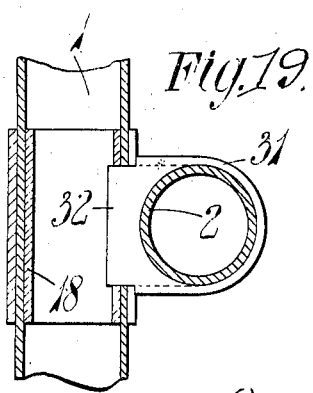

Oct. 16, 1923.  1,470,627
H. A. LAMPLUGH
HANDLEBAR FOR CYCLES AND MOTOR CYCLES
Filed Aug. 13, 1921    4 Sheets-Sheet 4
Fig.21.
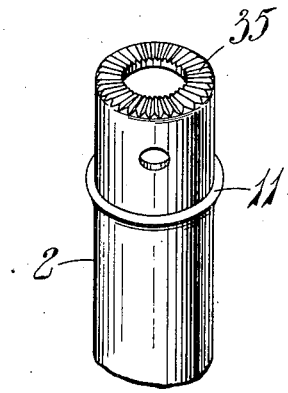
Fig.22.
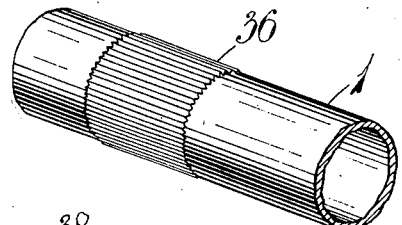
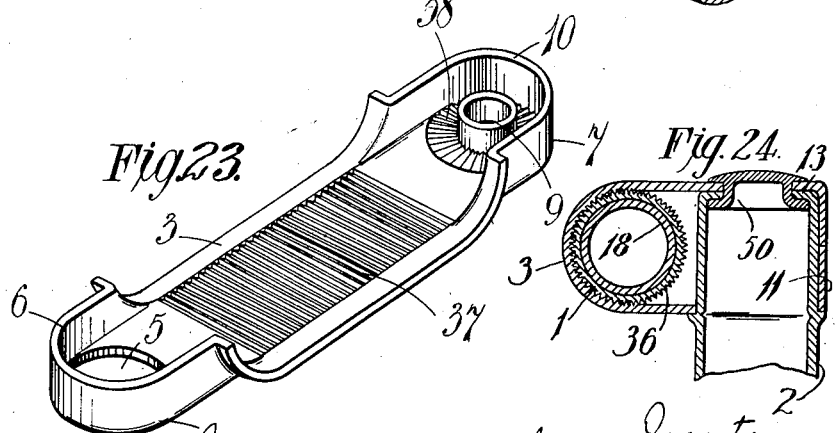
Inventor
Henry Arthur Lamplugh
By
B. Singer, Atty Patented Oct. 16, 1923.

1,470,627

UNITED STATES PATENT OFFICE.

HENRY ARTHUR LAMPLUGH, OF TYSELEY, NEAR BIRMINGHAM, ENGLAND.

HANDLEBAR FOR CYCLES AND MOTOR CYCLES.

Application filed August 13, 1921. Serial No. 492,008.

*To all whom it may concern:*

Be it known that I, HENRY ARTHUR LAMPLUGH, a subject of the King of Great Britain, residing at King's Road, Tyseley, near Birmingham, in the county of Worcester, England, have invented certain new and useful Improvements in Handlebars for Cycles and Motor Cycles; and I do hereby declare the following to be a full, clear, and exact description of the same.

My invention comprises improvements in handle bars for cycles and motor cycles and has for its object to provide an improved handle bar which will obviate the expense and difficulties of building and polishing incidental to the present type of handle bar wherein the stem and bar are brazed to a lug.

In handle bars as at present usually constructed the handle bar is united to the stem by a lug which is bent into engagement with both the bar and the stem. This lug is usually secured temporarily in position and then brazed both to the bar and the stem. After brazing in order to remove the surplus metal, the handle bars have either to undergo the process of pickling in acid or sand blasting. After the bars have been treated by one of these methods the surplus metal has to be filed off before the bar can be polished. In addition to the expense of these various operations the existing method has the disadvantage that when filing to remove surplus metal the tubes of which the handle bar and stem are made may be weakened adjacent the joint. Further, subsequent polishing operations are rendered more difficult owing to the surfaces of the tubes having been injured by filing. The object of the present invention is to construct a handle bar whereby the bar and the stem are united together permanently by what may be termed a "mechanical joint," i. e., a joint involving no brazing, welding or like operation involving a flux or a separate metal for uniting the bar and the stem to the clip.

According to this invention a lug is provided pressed to the required shape and bent into engagement with both the stem and the bar so as to provide a positive and permanent connection therewith.

It is to be understood that in a handle bar constructed in accordance with this invention the mechanical engagement between the lug or between one or more members associated with the lug and the handle bar and stem is relied on entirely for uniting the stem to the handle bar. The lug itself is not in all cases united mechanically both to the handle bar and to the stem as one or more additional securing members may be employed for uniting the lug either to the stem or to the handle bar but in every case the connection between the parts is a mechanical one.

Referring to the drawings:—

Figure 1 is a perspective view showing one form of the invention.

Figure 2 is a rear view of the construction shown in Figure 1.

Figure 3 is a side view in cross section.

Figure 4 is a sectional plan view.

Figure 5 is a perspective view showing the connecting lug.

Figure 6 is a perspective view of the locking member.

Figure 7 is a perspective view of the upper part of the stem employed in the construction shown in Figure 1.

Figure 8 is a sectional view in side elevation showing the employment of flanged holes for engagement by the projections on the locking member such as is shown in Figure 3.

Figure 13 is a sectional view in side elevation showing another construction.

Figure 14 is a sectional plan.

Figure 15 is a perspective view of the closing member employed in the construction shown in Figures 13 and 14.

Figure 16 is a perspective view showing the upper part of the stem employed in the construction shown in Figure 13.

Figure 17 is a sectional view in plan showing the construction illustrated by Figure 13.

Figure 18 is a view in sectional side elevation showing another construction.

Figure 19 is a sectional plan thereof.

Figure 20 is a perspective view showing the key piece employed in the construction shown in Figures 18 and 19.

Figure 21 is a perspective view showing a further construction of stem,

Figure 22 is a perspective view of a part of the handle bar employed in another construction.

Figure 23 is a perspective view of the connecting clip for employment with the constructions shown in Figures 21 and 22.

Figure 24 is a sectional view in side elevation showing a further modification.

Figure 9:
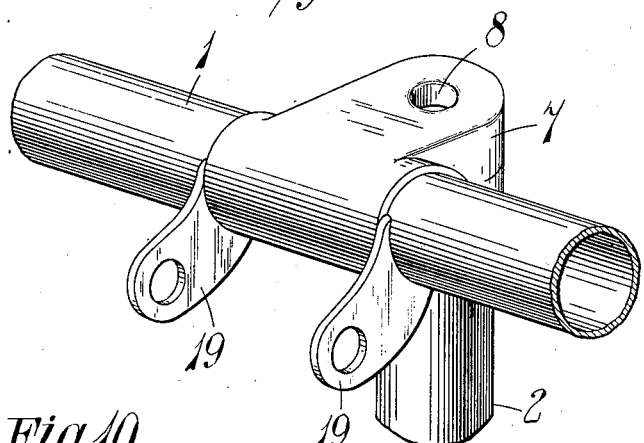
Figure 9 is a view in perspective showing another form of the invention.

In the construction shown in Figures 1 to 7, the handle bar 1 is connected permanently to the stem 2 by a lug or clip member which is shown in perspective in Figure 5. This lug or clip member has a central portion 3 and an end portion 4 which is provided with a hole 5. The end 4 is provided with a peripheral flange 6. The other end 7 of the lug is provided with a hole 8 which has a flange 9 around its periphery. Around the edge of the end 7 is an upwardly projecting flange 10.

The stem 2 is provided with an external shoulder 11 formed by expanding the metal as shown at 12.

The clip member is bent into the position shown in Figure 1 with its central portion 3 engaging with the handle bar and with its two end portions closed together for engaging the upper part of the stem 2. As will be seen from Figure 1, the part 4 rests upon the shoulder 11, whilst the part 7 is closed down on to the part 4.

The flange 9 passes through a hole formed at the top of the stem 2. This hole is formed in an inwardly bent flange 13 at the top of the stem. After being passed through the hole in the flange 13, the flange 9 is expanded as shown in Figure 3 so that it engages securely the said flange.

The locking member 14 is interposed between the handle bar and the upper end of the stem 2, the said locking member being completely enclosed by the lug. The locking member is provided with a concave surface 15 for engagement with the handle bar and a concave surface 16 for engagement with the stem. The surfaces 15 and 16 which are provided with a suitable number of tapered projections 17 engage in tapered holes in the handle bar and in the upper part of the stem.

The central portion of the handle bar may be strengthened by securing in a liner 18 if desired. This liner may be secured in position by compression on the bar especially in cases where the exterior of the bar is serrated.

The hole 8 may be filled by a suitable plug if desired.

As shown clearly in Figure 8, the holes engaged by the pins 17 instead of being drilled and tapered may be formed by drawing through thus forming flanges at their edges which engage with the liner 18 and provide a maximum of bearing surface for the pins 17.

Figure 10:
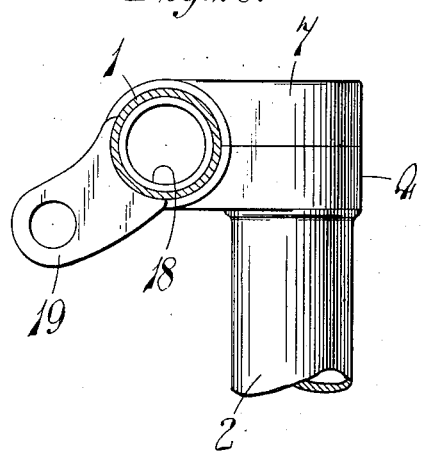
Figure 10 is a view in side elevation thereof.
Figure 11:
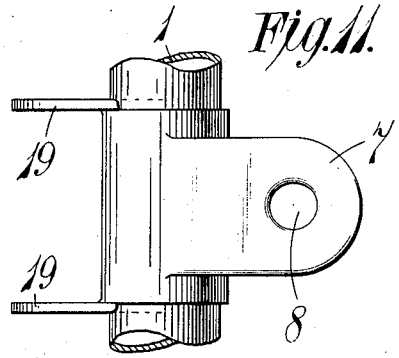
Figure 11 is a plan view.
Figure 12:
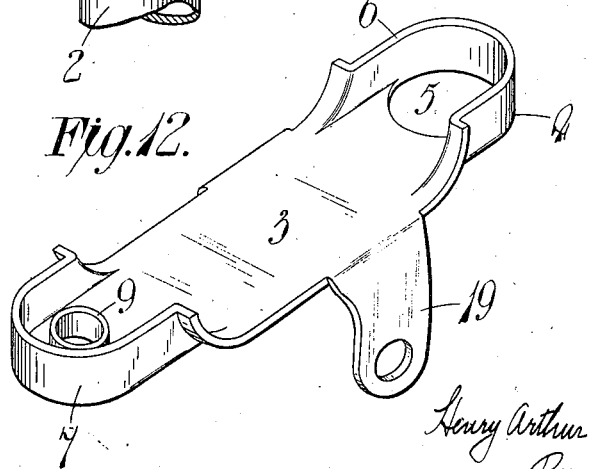
Figure 12 is a view in perspective showing the connecting lug employed in the construction shown in Figures 10 and 11.

Referring to Figures 9, 10, 11 and 12, in this construction the central portion 3 of the lug member is provided with two projecting portions 19 at its centre, so that when the device is assembled, the projections 19 form two spaced bearings for a roller lever brake or other fitting.

Referring to Figures 13, 14, 15, 16 and 17; in this construction the upper edge of the sleeve is provided with slots 25 which are adapted to be engaged by portions 26 formed on the lug. When this construction is adopted, the upper end of the stem is preferably closed by the fitting, such as 28 having a flange 29 at the top and a slot 30 for clearing one of the pins 17. The fitting 28 may be secured in position by driving in or by any other suitable means.

Referring to Figures 18, 19 and 20, in this case the locking member is omitted and a key member 31 is employed which fits over the upper part of the stem. This key member is provided with a tongue 32 engaging in a longitudinal recess or slot in the handle bar. The key member 31 is secured between the edges of the extremities of the lug.

In this construction, instead of providing an external shoulder on the stem, the stem may be provided with a peripheral groove 33 into which the edge of the connecting lug is forced. The hole at the top of the stem may be sealed by a plug such as 34 secured in position by any suitable means.

Referring to Figure 21, the construction shown therein is similar to that described with reference to Figures 1 to 7, except that the upper surface 35 of the stem is broached, serrated or roughened as also is the corresponding portion of the lug Figure 23. These serrations provide a firm connection between the lug and the stem.

In Figure 22 the central portion 36 of the handle bar is shown similarly treated.

It will be understood that both the top of the stem and the central portion of the handle bar may be broached, serrated, roughened or made non-circular, or otherwise formed to provide a better grip between the lug and said members.

In Figure 23 is shown in perspective a lug having a portion 37 serrated for engagement with the serrations 36 and also having a portion 38 serrated for engagement with the serrations 35.

In constructions wherein an adjusting screw or member is provided passing down the stem, the hole 8 at the top of the stem may be left open to allow for the passage of such screw or member.

It is to be understood that the lug itself need not be mechanically engaged with either the handle bar or the stem but one or more separate members may be employed for this purpose. As an example in Figure 24 the upper end portion of the lug instead of having a boss such as 9 (see Figure 5) is formed without such a boss and simply lies on the top of the stem. A tubular rivet 50, thimble, eyelet or like member is passed through the hole 8 and through the hole in the flange 13 of the stem and the said rivet 50 is expanded so as to unite the lug to the stem mechanically.

The component parts of such bar can be polished separately or automatically before assembly.

Although the invention has been described as applied to handle bars for cycles it is of course, also applicable to the handle bars for motor cycles and scooters.

What I claim then is:—

1. A handle bar joint for cycles comprising a handle bar, a stem, a lug pressed to the required shape and bent into engagement with said handle bar and with said stem, means for positively securing said handle bar within said lug and means for positively and permanently uniting said lug to said stem mechanically, whereby brazing, welding or like operations are avoided, and detachment of said lug is prevented.

2. A handle bar joint for cycles or motor cycles comprising a handle bar member, a stem member, and means carried by one of said members and adapted to positively and permanently unite said member with the other of said members mechanically and prevent detachment of the members so united.

3. A handle bar joint for cycles comprising a handle bar, a stem, a lug having a central portion engaging with the handle bar and two end portions having flanges at their edges which end portions are bent together and enclose the upper end of the stem, means for positively securing said handle bar within the said lug and means for positively and permanently uniting said lug to said stem mechanically, whereby brazing, welding or like operations are avoided, and detachment of said lug is prevented.

4. A handle bar joint for cycles comprising a handle bar, a stem, a lug having a central portion engaging with the handle bar and two end portions having flanges at their peripheral edges which end portions are bent together and enclose the upper end of the stem, a second flange located within the peripheral flange on one of said end portions, an inwardly disposed rim at the upper part of the stem, said second flange entering the upper part of the stem and being expanded below said rim to form a permanent mechanical engagement therewith, and means for mechanically locking said lug to the handle bar so as to prevent longitudinal and angular movement.

5. A handle bar joint for cycles comprising a handle bar, a stem, a lug having a central portion engaging with the handle bar and two end portions having flanges at their edges which end portions are bent together and enclose the upper end of the stem, a second flange located within the peripheral flange on one of said end portions, an inwardly disposed rim at the upper part of the stem, said second flange entering the upper part of the stem and being expanded below said rim to form a permanent mechanical engagement therewith, and additional mechanical means for locking the handle bar to the stem so as to prevent angular movement.

6. A handle bar joint for cycles comprising a handle bar, a stem, a lug pressed to the required shape and bent into engagement with said handle bar and with said stem, a locking member associated with and retained in position by the lug, and engaging both with the stem and with the handle bar, and additional means for positively and permanently uniting the lug to the stem mechanically, whereby brazing, welding or like operations are avoided, and disconnection of the lug is prevented.

7. A handle bar joint for cycles comprising a handle bar, a stem, a lug having a central portion engaging with the handle bar and two end portions having flanges at their edges which end portions are bent together and enclose the upper end of the stem, bracket arms projecting from the edges of said central portion and bent so as to carry brake mechanism, means for positively securing said handle bar with said lug and means for positively and permanently uniting said lug to said stem mechanically, whereby brazing, welding or like operations are avoided, and disconnection of the lug is prevented.

8. A handle bar joint for cycles comprising a handle bar, a stem, a lug pressed to the required shape and bent into engagement with said handle bar and with said stem, a locking member retained in position by the lug and having projections engaging with openings in the handle bar and in the stem, and means for positively and permanently securing the lug to the stem whereby brazing, welding or like operations are avoided.

9. A handle bar joint for cycles comprising a handle bar, a stem, a lug pressed to the required shape and bent into engagement with said handle bar and with said stem, a locking member retained in position by the lug and having projections engaging with flanged openings in the handle bar and in the stem, and means for positively and permanently securing the lug to the stem whereby brazing, welding or like operations are avoided.

In witness whereof I affix my signature.

HENRY ARTHUR LAMPLUGH.